(12) United States Patent
He et al.

(10) Patent No.: US 10,713,566 B2
(45) Date of Patent: Jul. 14, 2020

(54) EFFICIENT CALCULATIONS OF NEGATIVE CURVATURE IN A HESSIAN FREE DEEP LEARNING FRAMEWORK

(71) Applicant: Siemens Aktiengesellschaft, Munich (DE)

(72) Inventors: Xi He, Allentown, PA (US); Ioannis Akrotirianakis, Princeton, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 922 days.

(21) Appl. No.: 15/290,154

(22) Filed: Oct. 11, 2016

(65) Prior Publication Data

US 2018/0101766 A1   Apr. 12, 2018

(51) Int. Cl.
  *G06N 3/08* (2006.01)
(52) U.S. Cl.
  CPC .................................. *G06N 3/084* (2013.01)
(58) Field of Classification Search
  CPC ........................................................ G06N 3/084
  See application file for complete search history.

(56) References Cited

U.S. PATENT DOCUMENTS

| | | | | |
|---|---|---|---|---|
| 2014/0067738 A1* | 3/2014 | Kingsbury | ............... | G06N 3/08 706/20 |
| 2015/0161987 A1* | 6/2015 | Horesh | ................. | G10L 15/063 704/232 |

OTHER PUBLICATIONS

Stathopoulos, Andreas, and Konstantinos Orginos. "Computing and deflating eigenvalues while solving multiple right-hand side linear systems with an application to quantum chromodynamics." SIAM Journal on Scientific Computing;32.1 (2010): 439-462. (Year: 2010).*
Moré, Jorge J., and Danny C. Sorensen. "On the use of directions of negative curvature in a modified Newton method." Mathematical Programming 16.1 (1979): 1-20. (Year: 1979).*
Krizhevsky, Alex, Ilya Sutskever, and Geoffrey E. Hinton. "Imagenet classification with deep convolutional neural networks."; Advances in neural information processing systems. 2012. (Year: 2012).*

(Continued)

*Primary Examiner* — Li B. Zhen
*Assistant Examiner* — Markus A. Vasquez (57) ABSTRACT

A method for training a deep learning network includes defining a loss function corresponding to the network. Training samples are received and current parameter values are set to initial parameter values. Then, a computing platform is used to perform an optimization method which iteratively minimizes the loss function. Each iteration comprises the following steps. An eigCG solver is applied to determine a descent direction by minimizing a local approximated quadratic model of the loss function with respect to current parameter values and the training dataset. An approximate leftmost eigenvector and eigenvalue is determined while solving the Newton system. The approximate leftmost eigenvector is used as negative curvature direction to prevent the optimization method from converging to saddle points. Curvilinear and adaptive line-searches are used to guide the optimization method to a local minimum. At the end of the iteration, the current parameter values are updated based on the descent direction.

17 Claims, 7 Drawing Sheets

(56) References Cited

OTHER PUBLICATIONS

Martens J., Deep learning via Hessian-free optimization, in Proceedings of the 27th International Conference of Machine Learning, Haifa, Israel, (2010).
Stathopoulos A. and Orginos K., Computing and Deating Eigenvalues While Solving Multiple Right-Hand Side Linear Systems with an Application to Quantum Chromody-namics, SIAM Journal on Scienti_c Computing, 32 (1), 439-462, (2010).

* cited by examiner

100

Algorithm 1 The eigCG algorithm for solving $Ax = b$
1: Inputs: $A, k, r_0$, Termination tolerance tol
2: Outputs: CG solution $x$ and possible negative curvature direction $s$
3: Initialization: $r = b - Ax$, $V = []; i = j = 0$
4: while $\|r\|/\|r_0\| > $ tol do
5:     $j = j + 1, z = P^{-1}r, \rho_{prev} = \rho, \rho = r^T z$
6:     if $j == 1$ then
7:         $p = z$
8:     else
9:         $\beta_j = \rho/\rho_{prev}$
10:        $p = z + \beta_j p$
11:    end if
12:    if $i == m$ then
13:       $t_{prev} = t$
14:    end if
15:    $t = Ap$
16:    if $j > 1$ then
17:       $T_{j-1,j-1} = \frac{1}{\alpha_{j-1}} + \frac{\beta_j}{\alpha_{j-1}}$
18:    end if
19:    if $i == m$ then
20:       Find $2k$ lowest eigenpairs from $T_m Y = YM$ and $T_{m-1,.}Y = YM$
21:       Add an $m$-th row of zeros: $\bar{Y} = [Y; 0]$
22:       $Q = orth([Y\bar{Y}])$, set $H = Q^T T_m Q$
23:       Solve for the eigenpairs of $HZ = ZM$
24:       Restart: $V = VQZ; i = 2m; T_i = M$
25:       Return $s = V(:, 1)$
26:       Compute the $i + 1$ row of $T_{i+1,.} = z^T AV$
27:       $w = z - S\rho_{prev}; T_{i+1,i} = w^T V/\sqrt{\rho}$
28:    else
29:       $T_{i+1,i} = -\sqrt{\beta_j}/\alpha_{j-1}$
30:    end if
31:    $i = i + 1; V(:,i) = z/\sqrt{\rho}$
32:    $\alpha_j = r^T z/p^T t$
33:    $x = x + \alpha_j p$
34:    $r = r - \alpha_j t$
35: end while

Algorithm 2 eigCG-HF algorithm

1: Input Loss(Error) function $\mathcal{L}(\theta)$, initial parameter $\theta_0$, starting point $s_0$ for eigCG solver
2: for $t = 1, 2, \ldots$ do
3:     Compute gradient $g_t \leftarrow \nabla f(\theta_t)$
4:     Build local approximated quadratic model by using stochastic Hessian information $\mathcal{H}_t$ $$m_{\theta_t}(d) = \mathcal{L}(\theta_t) + g_t^T d + \frac{1}{2} d^T \mathcal{H}_t d \qquad (8)$$

5:     Run CG algorithm to minimize $m_{\theta_t}(d)$. If negative curvature is detected, we turn to run eigCG. $(s_t, d_t) \leftarrow \text{eigCG}(\mathcal{H}_t, -g_t, s_{t-1})$
6:     Derive descent direction $p_t = p(s_t, d_t)$
7:     Compute learning rate $\alpha_t$ by some line-search methods
8:     $\theta_{t+1} \leftarrow \theta_t + \alpha_t p_t$
9: end for

EFFICIENT CALCULATIONS OF NEGATIVE CURVATURE IN A HESSIAN FREE DEEP LEARNING FRAMEWORK

TECHNICAL FIELD

The present disclosure relates to an efficient calculations of negative curvature in a hessian free deep learning framework. The technology described herein is particularly well-suited for, but not limited to, optimization problems encountered in deep learning applications.

BACKGROUND

The calculation of the learning parameters (hyperparameters) in deep neural networks gives rise to very complex and difficult nonlinear optimization problems. These optimization problems are non-convex and possess a large number of saddle points and local minima. Currently, the most widely used optimization algorithms used in deep learning are first order methods and especially the Stochastic Gradient Descent (SGD) methods. However SGD is not able to take advantage of the curvature information and as a results they converge very slowly to first order critical points. This means that a local minimum may never be reached.

Recently a second order optimization method referred to as "Hessian Free Deep Learning" has been proposed that is able to solve the optimization problems arising in deep learning architectures efficiently. Hessian Free Deep Learning uses the Conjugate Gradient (CG) method to solve the Newton equations iteratively. In turn, this makes it possible to solve the large optimization problems arising in many different architectures of deep learning by appropriately utilizing the CG method.

A major limitation of the Hessian Free Deep Learning algorithm is that it cannot easily incorporate the information related to the negative curvature in the optimization algorithm. Negative curvature is crucial when developing algorithms with guarantees of convergence to critical points that satisfy second order optimality conditions. Negative curvature allows optimization algorithms to escape from saddle points and local maxima when a local minimum is shot. Note that SGD does not have a means to distinguish between saddle points and local minima/maxima as the first order optimality conditions are satisfied at those points.

The calculation of negative curvatures is not an easy task and is related to the calculation or estimation of the left-most eigenpairs (i.e., the eigenvalues and their corresponding eigenvectors) of the Hessian matrix. Estimations of eigenpairs can be calculated during the CG method or the Lanczos method. However the simultaneous estimation of eigenpairs and solution of a non-convex problem in a deep learning framework is not well explored yet.

SUMMARY

Embodiments of the present invention address and overcome one or more of the above shortcomings and drawbacks, by providing methods, systems, and apparatuses related to an efficient calculation of negative curvature in a hessian free deep learning framework. The optimization problems encountered in deep learning are highly non-convex. As a result it is important to use optimization algorithms that are able to exploit the local non-convexity of the models and converge to local optima efficiently and robustly. In order to characterize the local non-convexity the leftmost eigenpairs of the Hessian matrix of the loss function must be approximated. The techniques described herein may be applied to determine the leftmost eigenpairs of the Hessian matrix while solving the second order optimality conditions. The leftmost eigenvector is used as a direction of negative curvature allowing the algorithm to converge to a local minimum.

According to some embodiments, a computer-implemented method for training a deep learning network includes defining a loss function corresponding to the deep learning network. A training dataset comprising a plurality of training samples is received and current parameter values are set to initial parameter values. Then, a computing platform is used to perform an optimization method which iteratively minimizes the loss function over a plurality of iterations. Each iteration comprises the following steps. An eigCG solver is applied to determine a descent direction by minimizing a local approximated quadratic model of the loss function with respect to current parameter values and the training dataset. The descent direction may be derived, for example, based on a test on a rate of decrease of the local approximated quadratic model of the loss function. In some embodiments, the descent direction is derived based on a curvilinear direction algorithm. Once the descent direction is determined, the approximate leftmost eigenvector and eigenvalue are calculated while solving the Newton system. The approximate leftmost eigenvector is used as negative curvature direction to prevent the optimization method from converging to saddle points. Curvilinear and adaptive linesearches are used to guide the optimization method to a local minimum. At the end of the iteration the current parameter values are updated based on the descent direction. In some embodiments, the current parameter values are further updated according to a learning rate determined by a line search method. This line search method may be, for example, an Armijo line search method or Goldstein linesearch method.

In some embodiments of the aforementioned method, the local approximated quadratic model of the loss function comprises the loss function applied to the current parameter values, the gradient of the loss function when applied to the current parameter values, and an approximation of the curvature of the loss function. For example, in one embodiment, the local approximate quadratic model incorporates stochastic Hessian information corresponding to the training dataset. This stochastic Hessian information may include, for example, a random sampling the training dataset. This sampling may be fixed or, in some instances, resampled during each of the plurality of iterations. In some embodiments, initial parameter values are also selected based on a random sampling of a normal distribution of the training dataset.

According to other embodiments system for training a deep learning network includes one or more processors and a non-transitory, computer-readable storage medium in operable communication with the processors. The computer-readable storage medium comprises one or more programming instructions that, when executed, cause the processors to: define a loss function corresponding to the deep learning network; receive a training dataset comprising a plurality of training samples; and set current parameter values to initial parameter values. The instructions further cause the processors to iteratively minimize the loss function over a plurality of iterations, wherein each iteration includes applying an eigCG solver to determine a descent direction that incorporates negative curvature directions and steepest descent directions by minimizing a local approximated quadratic model of the loss function with respect to current parameter values and the training dataset. At the end of the iteration, the current parameter values may be updated based on the descent direction. The iterative process executed by the system may be modified in some instances to incorporate features which are similar to those discussed above with respect to the computer-implemented method for training a deep learning network.

In some embodiments of the aforementioned system, the one or more processors are part of a parallel computing platform which is used to parallelize one or more processing operations included in iteratively minimizing the loss function. For example, in one embodiment, the training dataset is divided into a plurality of training subsets and the eigCG solver is applied to each of the training subsets in parallel to determine the descent direction by minimizing the local approximated quadratic model of the loss function with respect to the current parameter values and the training subset.

According to other embodiment, an article of manufacture for training a neural network includes a non-transitory, tangible computer-readable medium holding computer-executable instructions for performing a method comprising setting current parameter values to initial parameter values and iteratively minimizing a loss function corresponding to the neural network over a plurality of iterations. During each iteration, an eigCG solver is applied to determine a descent direction by minimizing a local approximated quadratic model of the loss function with respect to current parameter values and a training dataset. The current parameter values may then be updated based on the descent direction.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to an efficient calculations of negative curvature in a hessian free deep learning framework. Briefly, the techniques described herein utilize an iterative method that is able to estimate a small number of the leftmost eigenpairs of the Hessian matrix. The leftmost eigenpairs are calculated by adding a small extra computational cost to the standard CG method. When the Hessian matrix becomes indefinite, it is automatically detected by checking the smallest eigenvalue (which will be negative). At that point the corresponding eigenvector is exploited in a line search scheme that uses negative curvature (note that the left-most eigenvector provides a good estimate of the negative curvature direction). The techniques described herein may be applied in training various deep learning and other neural networks, using various types of input data (e.g., speech, human gestures, sensor data obtained from complex systems such as gas turbines, etc.).

With the techniques described herein, a deep neural network is obtained by putting together many different "neurons" in a specific formation. A neuron is the basic computational entity of deep neural networks which takes a number of inputs and outputs a nonlinear transformation of the input that can help to identify specific patterns in the input. The function that defines the nonlinear transformation is called activations function. Commonly used activations functions are the sigmoid, hyperbolic tangent and rectified linear units. Deep neural networks comprise several layers, each of which has a number of neurons. The first and last layers are commonly used input and output layers while all the intermediate layers are called hidden. The main aim of using deep neural networks is to test a hypothesis that a specific characteristic can be derived from the input data. The hypothesis takes the form of a nonlinear model whose parameters are determined so that the error between the observed data and the values determined by the model are minimized. That minimization problem forms the heart of every deep learning architecture (e.g., feed forward, recurrent, convolutional). A major complexity is that the optimization problem is nonconvex containing a large number of local optima and an even larger number of saddle points. In addition, due the large number of input data and neurons the number of parameters describing the model can be very high resulting in a very large-scale optimization problem which classical methods cannot solve in reasonable time. Stochastic Gradient Descent (SGD) has been used extensively to solve that type of optimization problems. However SGD uses first order information (i.e., gradient information of the loss function) and as such it cannot escape from saddle points encountered during the process of reaching a local minimum of the loss function. The classification error at a saddle point is always larger than that on a local minimum. For this reason the techniques discussed herein provide a method that is able to avoid saddle points and converge to local minima thereby improving the accuracy of the overall classification process. The disclosed method considers a quadratic ac approximation of the loss function and solves the corresponding Newton system using a modification of the Conjugate Gradient method that is able to take advantage of negative curvature directions and guide the optimization process away from saddle points and towards local minima.

The term "Hessian" or "Hessian matrix," as used herein, refers to a matrix of second-order partial derivatives of a loss function, which are generally used in non-linear optimization methods which construct a quadratic approximation of the objective function. Explicit construction of the Hessian and solution of the Newton system (which requires the inversion of the Hessian matrix) are very computationally intensive tasks. Thus, some second order methods of optimization are designed to not require explicit formation of the Hessian. These optimization techniques are referred to Hessian-Free (HF) training techniques. Such techniques determine the result by computing only multiplications of the Hessian matrix and the gradient vector, omitting the direct formation and inversion of the Hessian matrix. To guarantee convergence however the Hessian matrix has to be positive definite, which is not the case in deep neural networks, as the objective function is nonconvex. In fact, in many iterations, the Hessian matrix is indefinite which forces the method to make very small progress and may force it to converge to a saddle point. To avoid such situations, the technique described herein calculates an approximation of the negative curvature direction simultaneously with the solution of the Newton system using a CG method. As would be understood by one skilled in the art, the leftmost eigenvector provides a negative curvature direction that is sufficient to escape a saddle point and allow the optimization method to make progress towards a local minimum. Computing an approximation of the leftmost eigenvector together with its corresponding eigenvalue can be efficiently done by modifying the CG method.

Figure 1:
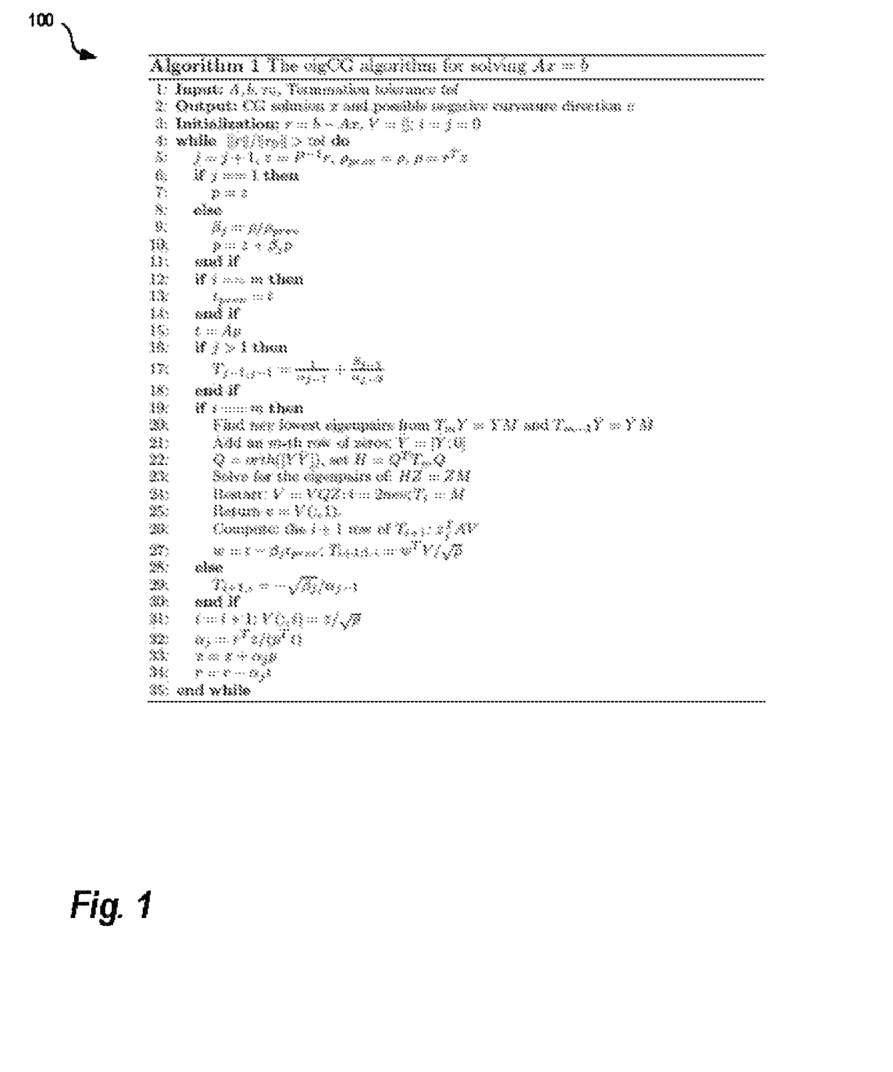
FIG. 1 illustrates an algorithm for obtaining the approximated left-most eigenpairs in accordance with some embodiments of the present invention.

FIG. 1 illustrates an algorithm 100 for obtaining the approximated left-most eigenpairs in accordance with some embodiments of the present invention. This algorithm, referred to as "eigGC" is based on the classic Conjugate Gradient (CG) algorithm. The eigCG algorithm generates approximations of the leftmost eigenpairs of the coefficient matrix (Hessian matrix) using the auxiliary matrix V as an eigenvector search subspace to keep track of the lowest nev eigenpairs. When the subspace V increased to dimension m, which has to be large than 2 nev, the algorithm is restarted.

Figure 2:
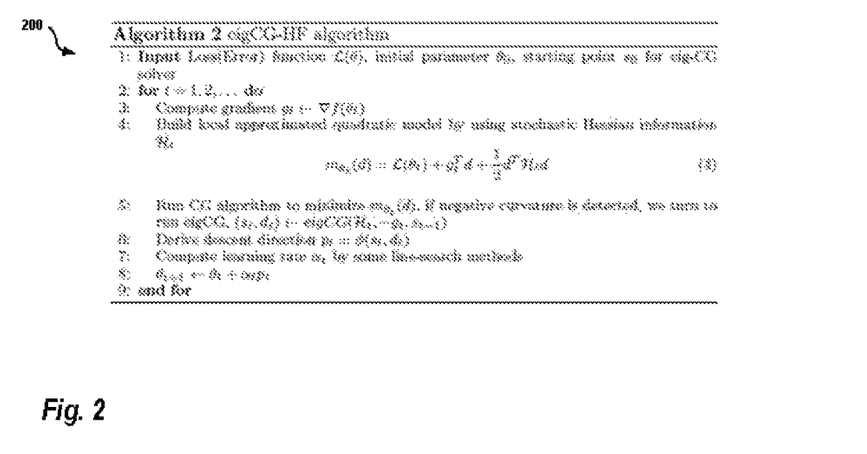
FIG. 2 describes an algorithm which combines eigCG with the conventional Hessian-Free (HF) optimization method, according to some embodiments.

At the beginning of the eigCG algorithm shown in FIG. 2, the matrix V comprises the normalized CG residual $z/p_j$. The projection matrix $T_m$ is determined with the following similar steps as those in the Lanczos method. More specifically the projection matrix $T_m$ is defined as follows:

$$T_j = \begin{pmatrix} 1/\alpha_1 & -\sqrt{\beta_2}/\alpha_1 & & & \\ -\sqrt{\beta_2}/\alpha_1 & 1/\alpha_2 + \beta_2/\alpha_1 & & & \\ & & \ddots & & \\ & & & 1/\alpha_{j-1} + \beta_{j-1}/\alpha_{j-2} & -\sqrt{\beta_{j+1}}/\alpha_j \\ & & & -\sqrt{\beta_{j+1}}/\alpha_j & 1/\alpha_j + \beta_j/\alpha_{j-1} \end{pmatrix} \quad (1)$$

When the dimension of V reaches m, the process is restarted in a similar fashion as every eigenvector using k=nev. Then the eigenpairs of the tridiagonal matrices $T_m$ and $T_{m-1}$ are determined. Note that the matrix $T_{m-1}$ includes the first (m−1) rows and columns of the matrix $T_m$, and its m-th row and column are simply filled with zeros, so that matrix Y and $\bar{Y}$ can have the same dimensionality m. The restart step the basis matrix V and its corresponding projection matrix Tnev are computed. Note that the matrix Tnev is diagonal and the columns of V remain orthonormal. The eigCG method needs to store m additional vectors representing the columns of the matrix V. These vectors are approximations of the m leftmost eigenvectors and the eigenvalues of the projection matrix $T_m$. The extra computational in terms of additional matrix-vector products is related to the restart mechanism only, and is negligible. This is due to the fact that all matrices involved in the restart process are of a very small dimension m. Typical values of m are 30 to 40 which are extremely small compared to the original dimension of the Hessian matrix of the loss function of the deep learning problem (which can be of the order of hundreds of thousands).

FIG. 2 describes an algorithm 200 which combines eigCG with the conventional Hessian-Free (HF) optimization method, according to some embodiments. This algorithm 200, referred to herein as eig-HF improves upon conventional techniques in at least two respects. The first improvement is that eig-HF provides a more efficient way to calculate the damping parameter to make the Hessian positive definite when it is indefinite. This is because the eig-HF method can calculate inexpensively a very good approximation of the leftmost eigenvalue and use it as the damping parameter used to transform the indefinite Hessian matrix to a positive definite one. The second improvement is that the eigCG algorithm 100 is used instead of the classic CG method for solving the Newton system. This allows an approximation of the leftmost eigenpair of the Hessian to be calculated simultaneously with the solution of the Newton system. Furthermore, when the Hessian matrix is indefinite, the absolute value of minimum eigenvalue may be used as the damping parameter and the corresponding eigenvector as a direction of negative curvature. Additional criteria and a line-search scheme can also be used to determine when to use the negative curvature and to ensure monotonic decrease of the loss function and its convergence to a local minimum.

Let the Newton-type direction derived from CG by represented by the vector $s_n$ and the negative curvature direction be represented by the vector $d_n$. Then, $s_n$ and $d_n$ are defined as descent directions if the following conditions are satisfied:

Condition 1: There exists a positive number c such that $$s_n^T g_n \leq -c\|g_n\|^2. \quad (2)$$

There exists a positive number E such that $$d_n^T g_n \leq 0 \text{ and } d_n^T B_n d_n \leq -\in \|g_n\|^2. \quad (3)$$

Indeed, if $d_n$ is derived from the eigCG-HF algorithm 200, $d_n^T B_n d_n = M_{11}$ and $\|d_n\|=1$ because $(M_{11}, d_n)$ is selected as the approximating leftmost eigenpair of damped Hessian matrix $B_n$. This means that, as long as negative curvature is detected, there will always be a negative $M_{11}$ and one only need verify if $M_{11} \leq -\in \|g_n\|^2$ and $d_n^T g_n \leq 0$.

If $d_n$ is not a negative curvature, it may be set to 0. Otherwise, if $d_n$ is not 0, a function $\phi(s_n, d_n)$ may be determined to combine two derived descent directions, thus exploring two approaches to find out the final descent direction. Under the first approach, at each iteration, the direction is selected based on a test on the rate of decrease of the quadratic model of the objective function. This selection is stated as $$\frac{g_n^T s_n}{\|s_n\|^2} \geq \tau m(\theta_n + d_n) \quad (5)$$

where τ is a positive constant and m(θ$_n$+d) is a quadratic model of the loss function $f(\theta) - f(\theta_n)$. The value of p$_n$ is set to s$_n$ if Equation (5) is true; otherwise, p$_n$ is set to d$_n$.

The second idea used in finding the final descent direction is commonly referred to as "curvilinear direction" where two bounds are selected as:

$$l = \tau_1 m(\theta_n + d_n) \text{ and } u = \tau_2 m(\theta_n + d_n) \quad (3)$$

where $\tau_1 \leq \tau_2$ are all positive values. Denoting $$\gamma = \frac{g_n^T s_n}{\|s_n\|^2},$$

p$_n$ may then be selected as follows:

$$-p_n = \alpha d_n \text{ if } l \geq \gamma$$

$$-p_n = \alpha^2 s_n + \alpha d_n \text{ if } l < \gamma \leq u$$

$$-p_n = \alpha^2 s_n \text{ if } \gamma > u, \quad (7)$$

in which α is a positive parameter and usually called the step-size of the line search methods used by the optimization method. After the descent direction p$_n$ is derived, a line-search method may be used to find the step-size α$_n$. This line-search may be implemented, for example, using any standard line search technique generally known in the art including, without limitation, the Armijo, Wolfe and Goldstein techniques.

Figure 3:
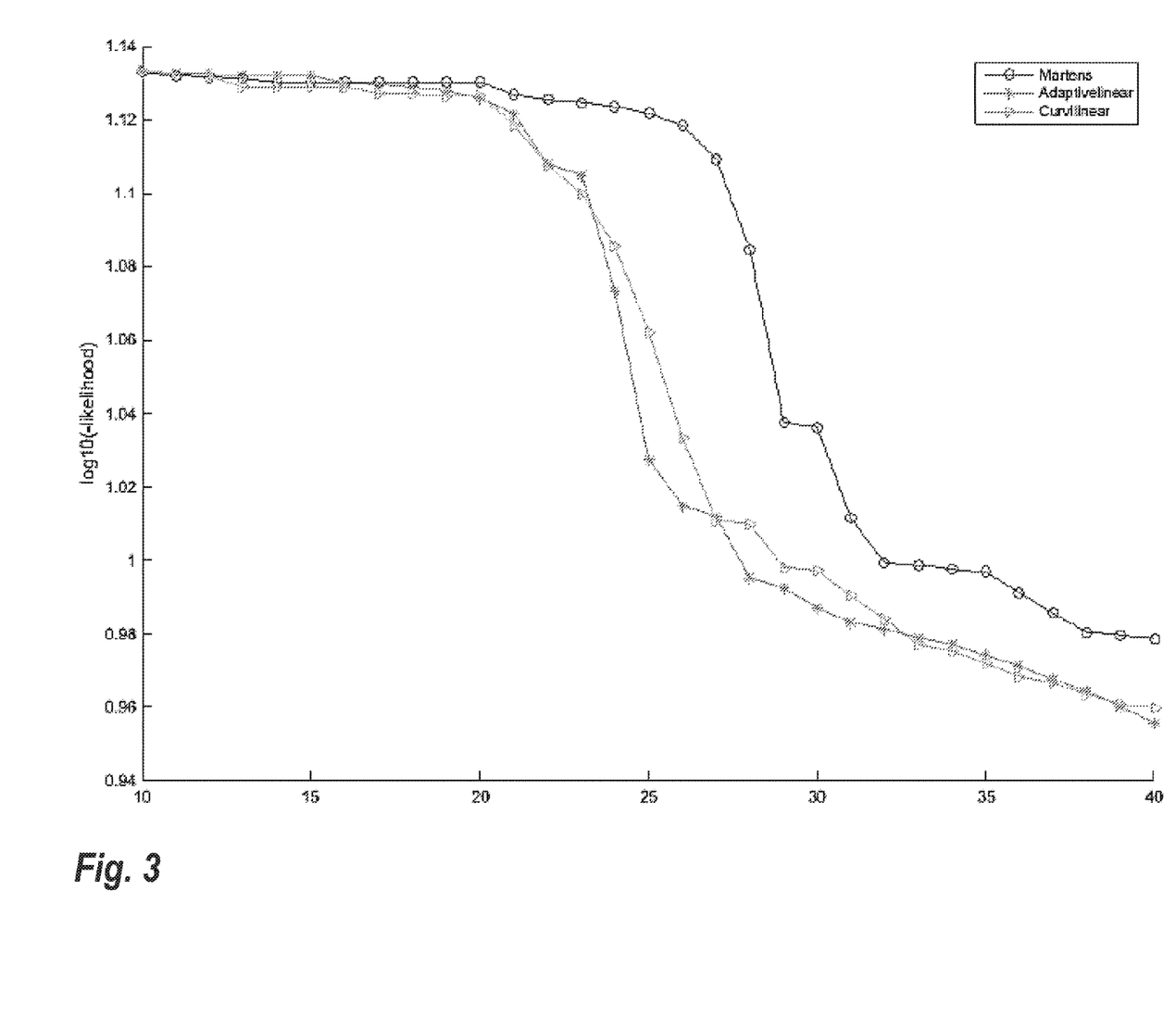
FIG. 3 shows an example of computational results acquired using eigCG-HF, according to some embodiments.

FIG. 3 shows an example of computational results acquired using eigCG-HF, according to some embodiments. In this example, the eigCG-HF algorithm 200 was executed on a data set, which included a training set with 40 features and 2000 samplings; and a testing set with 40 features and 1000 samplings set as testing set. This data was selected as a subset of synthetic curves dataset generally known in the art, referred to as CURVES.

In FIG. 3, the line with circle markers labeled "Martens" represents the original HF algorithm, applied without considering negative curvature direction. The HF algorithm deviates from the original HF algorithm whenever the existence of negative curvature is detected, and the previous iteration is used as descent direction. This neglects any of the advantages of negative curvature that may exist in the data. With respect to eigCG-HF, where adaptive-linear (denoted with asterisk markers) label is used to stand for selection and a curvilinear (denoted with triangle markers) label is used for selection, negative curvature is used to seek a more efficient descent direction. Adaptive linear and curvilinear line searches may be defined using Equation (7), as discussed above.

One can see from FIG. 3 that, before the 21st epoch, function values decrease very slowly, and all three methods shares similar convergence rates. However, after the first detection of negative curvature at the 21st epoch, one can see both eigCG-HF with Adaptive linear and eigCG-HF with Curvilinear line-search begin to reduce the loss function value while the original HF algorithm maintains the function value. This is a representative example where the optimization method described herein can escape a saddle point in an effective way and make faster progress towards a local minimum than the original HF methods. Additionally, as is shown in FIG. 3, the final loss function value of the original HF algorithm is greater than Adaptive-linear and Curvilinear, which indicates that eigCG-HF has better classification performance.

Figure 4:
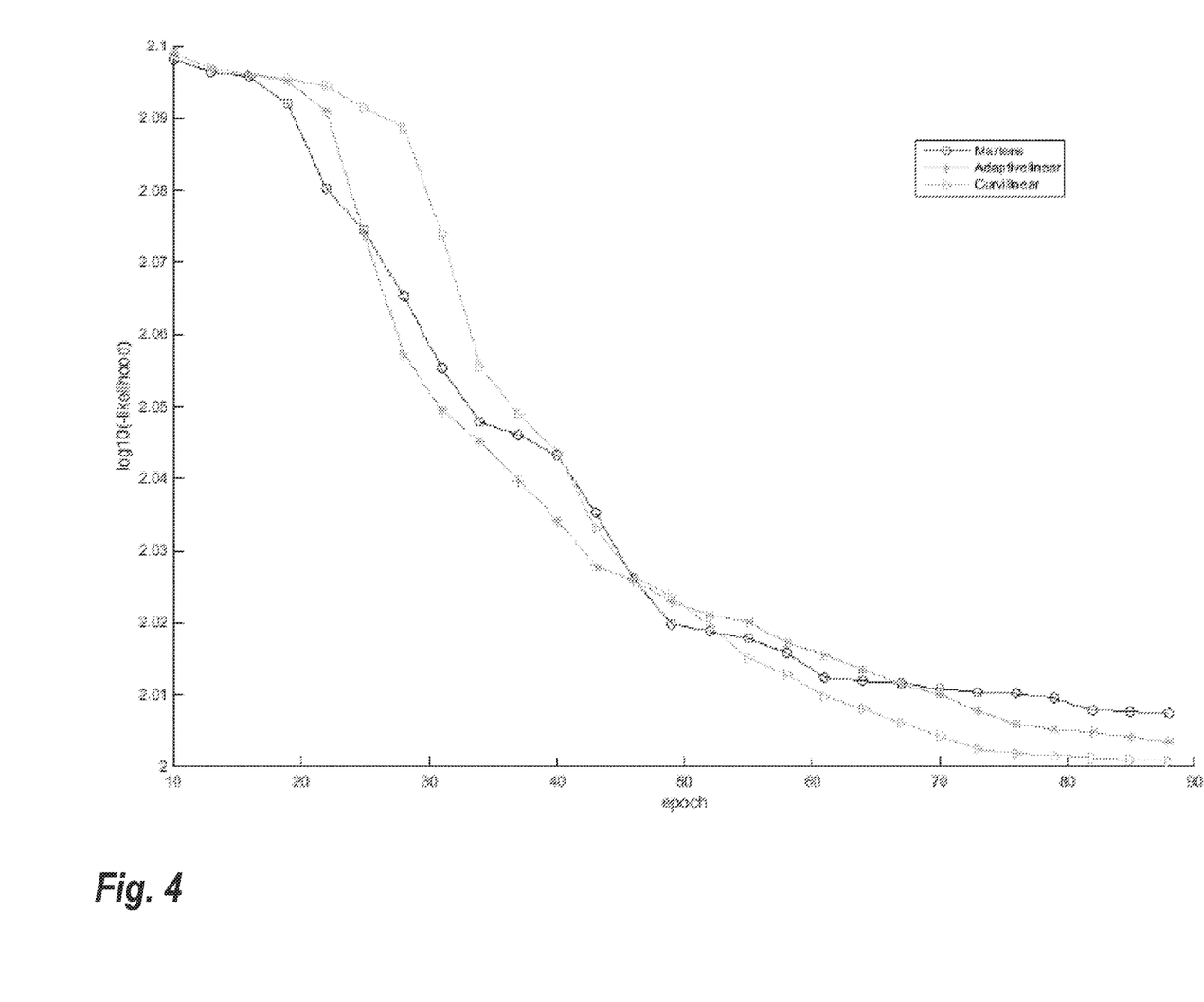
FIG. 4 illustrates a second example where the eigCG-HF algorithm is applied to the whole CURVES dataset, in accordance with some embodiments of the present invention.

FIG. 4 illustrates a second example where the eigCG-HF algorithm is applied to the whole CURVES dataset, in accordance with some embodiments of the present invention. The labeling of the datasets for this example is identical to that used above with reference to FIG. 3. The dataset used for FIG. 4 included 784 features and 20000 samplings as training set and 10000 samplings as testing set. The original HF algorithm provides slightly better results in the early stages; however, as the algorithms continue to run up to 90 epochs, the loss function value of eigCG-HF is still lower than that of HF, which shows that eigCG-HF provides better classification performance.

Figure 5:
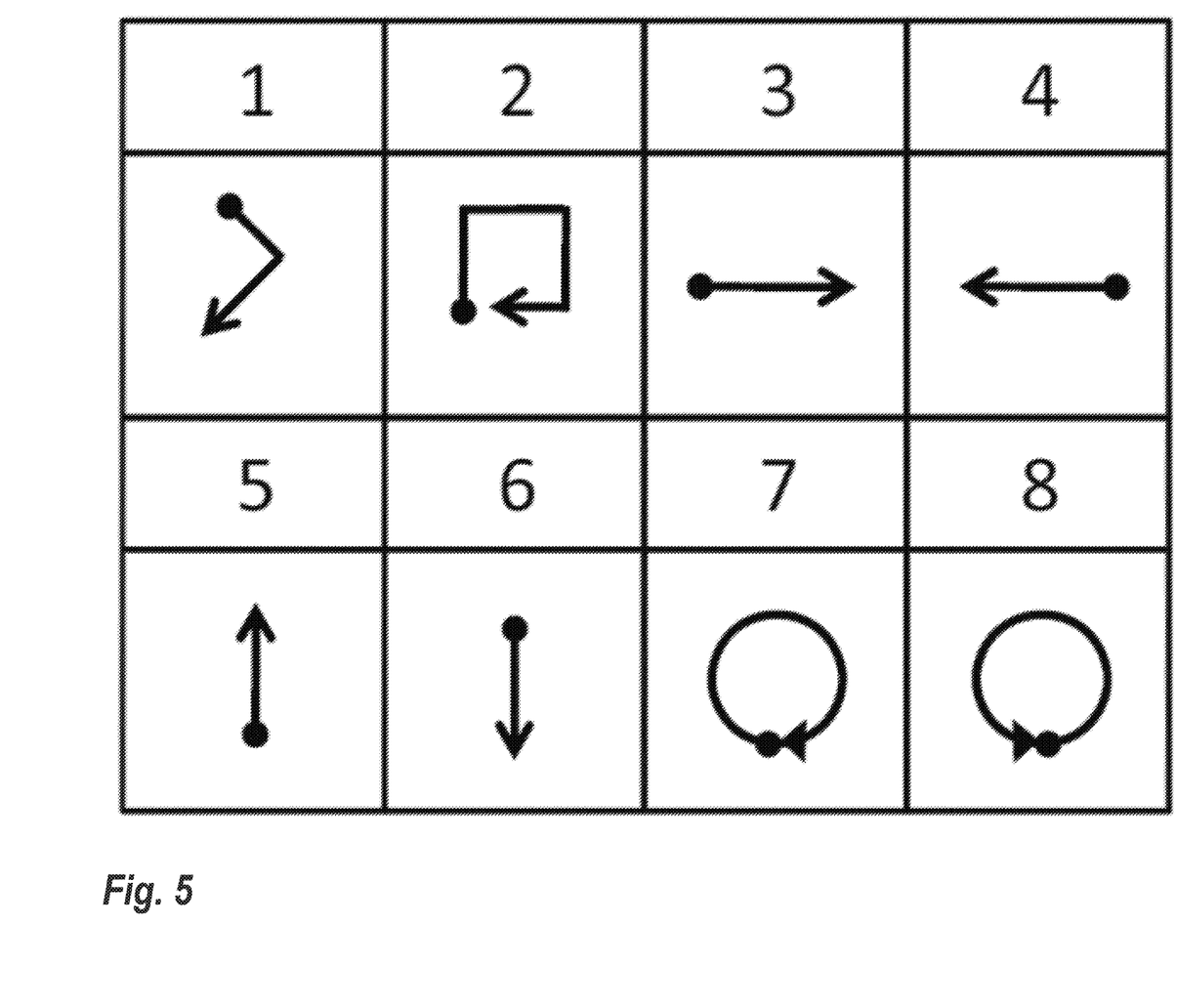
FIG. 5 illustrates the gesture library of uWave which includes eight gestures.

For a second example, consider a multivariate time series classification problem where a well-designed all convolutional neural network is used. In this example, a large gesture library uWave is used with overall 4478 samples, collected from eight users over an elongated period of time. FIG. 5 illustrates the gesture library of uWave which includes eight gestures. Each gesture corresponds to an integer number from 1 to 8. Each sample in uWave is a −3D dimension time series with length 315. In the experiments, 80% of the samples were set as training data and the rest of the samples were set as validation data. In the experiment, cross-entropy was adopted and a fully connected neural network was used. The eigCG-HF algorithm was comprised with two strategies for choosing learning rate and conventional HF-CG without taking negative curvature direction into account. Within the same amount of 200 epochs, the training error for eigCG-HF achieves at 0.96% while conventional HF-CG get stuck at 1.15%. This is another example demonstrating that eigCG-HF can outperform classic Hessian Free methods that do not explicitly take into consideration the negative curvature information when approaching a saddle point.

Figure 6:
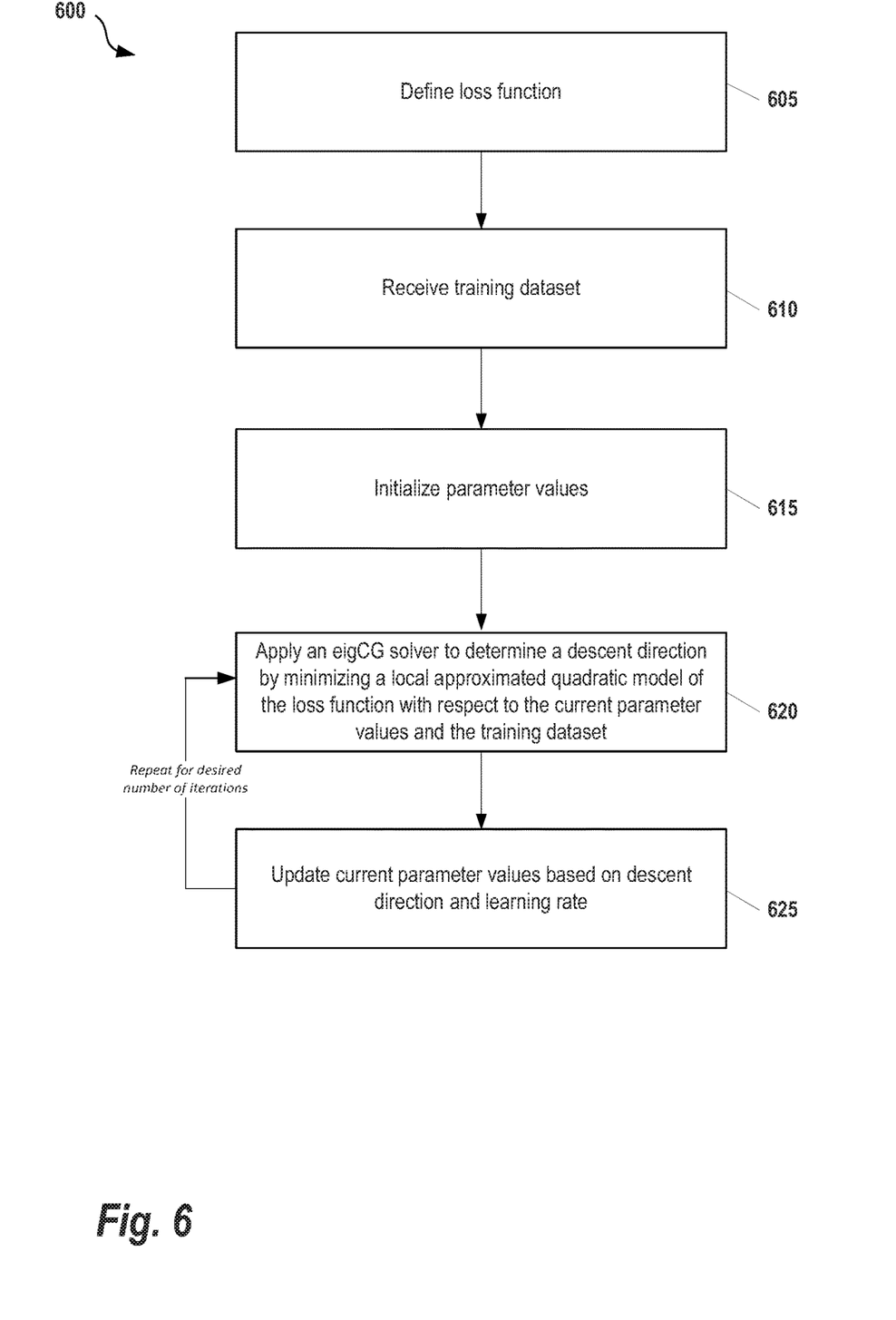
FIG. 6 illustrates a computer-implemented method for training a deep learning network, according to some embodiments.

FIG. 6 illustrates a computer-implemented method 600 for training a deep learning network, according to some embodiments. This method 600 may be executed, for example, a parallel computing platform (see FIG. 7) or any other computing device generally known in the art. At step 605, a loss function corresponding to the deep learning network is defined. In general the loss function measures the compatibility between a prediction and a ground truth label. The exact loss function will depend on the type of problem being solved by the network; however, in general, any loss function known in the art may be employed. For example, for classification problems, a Support Vector Machine (e.g., using the Weston Watkins formulation) or a Softmax classifier may be used. For predicting real-valued quantities, the loss function may use regression-based methods. For example, in one embodiment, the loss function measures the loss between the predicted quantity and the ground truth before measuring the L2 squared norm, or L1 norm of the difference Continuing with reference to FIG. 6, at step 610 a training dataset is received. This training dataset comprises ground truth values for the type of data being analyzed. For example, for speech classification, the training dataset may include audio samples and corresponding labels. Next, at step 615 the parameters of the method are set to initial values. In some embodiments, the initial values are defined by the user. In other embodiments, the initial parameter values are selected based on a random sampling of a normal distribution of the training dataset.

At steps 620-625, the computing platform is used to iteratively minimizing the loss function over a plurality of iterations. At step 620, an eigCG solver is applied to determine a descent direction by minimizing a local approximated quadratic model of the loss function with respect to the current parameter values and the training dataset. As used herein, the term "eigCG solver" refers to algorithms for solving the system of Newton equations discussed above with respect to FIG. 2. The eigCG solver itself may be tailored to the computing environment. Thus, for example, for parallel computing environments, the eigCG solver may be designed to parallelize operations across multiple processors.

This local approximated quadratic model used in step 620 may include, for example, the loss function applied to the current parameter values, the gradient of the loss function when applied to the current parameter values, and an approximation of the curvature of the loss function. One example of the model is shown in Equation (4) of the eigCG-HF algorithm 200 as presented in FIG. 2. In some embodiments, the local approximate quadratic model incorporates stochastic Hessian information corresponding to the training dataset. For example, in one embodiment, the stochastic Hessian information comprises a random sampling the training dataset. This sampling may be used for each application of the local approximated quadratic model or, in some instances, the training dataset may be resampled during each iteration to update the stochastic Hessian information. The descent direction may derived at step 620, for example, based on a test on a rate of decrease of the local approximated quadratic model of the loss function or a curvilinear direction algorithm.'

Figure 7:
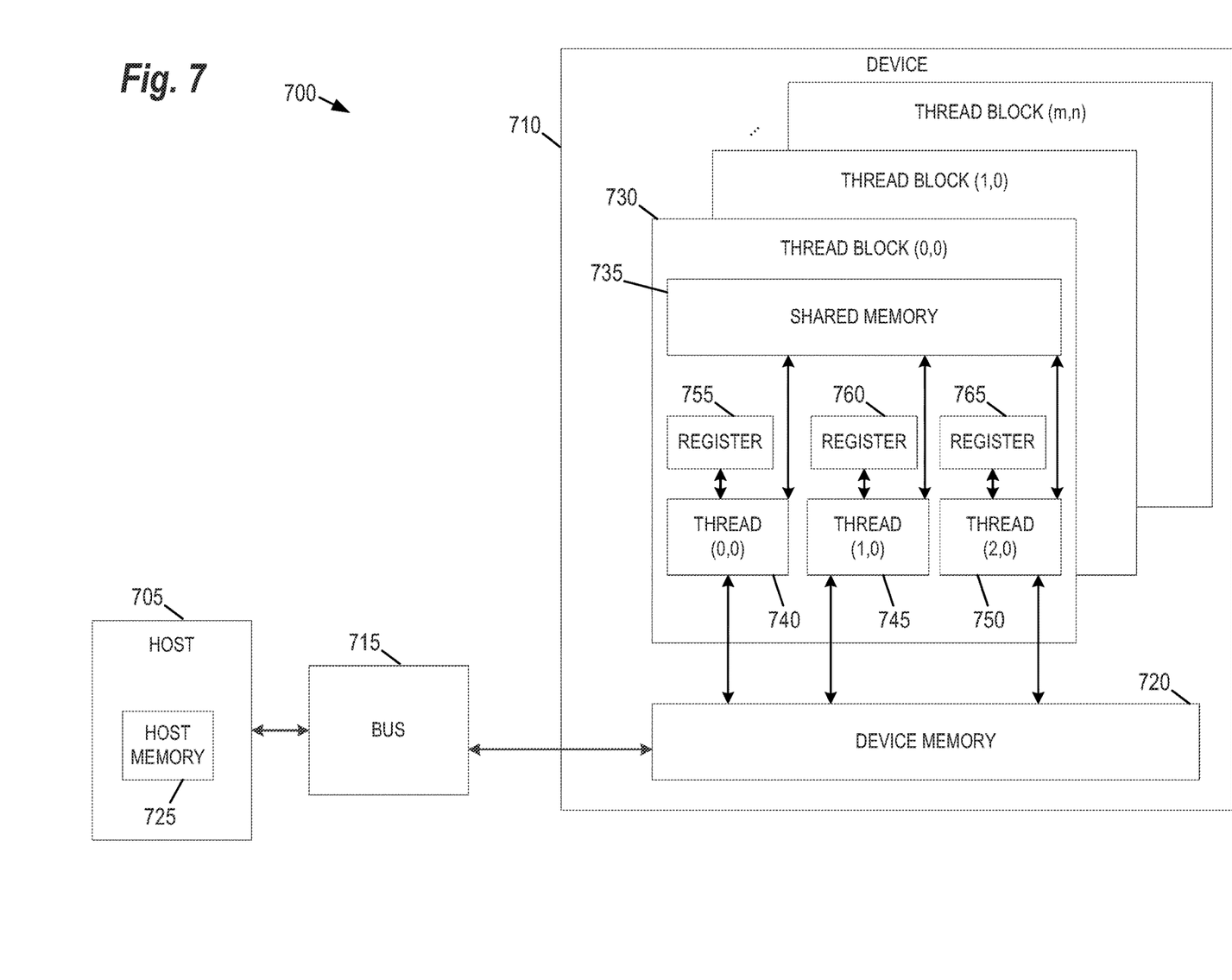
FIG. 7 provides an example of a parallel processing memory architecture that may be utilized by to perform computations related to execution of the eigCG-HF algorithm, according to some embodiments of the present invention.

Once the solver is applied, the current parameter values are then updated at step 625 based on the descent direction. The parameters values may be further updated based on learning rate determined by a line search method such as the Armijo line search method. Steps 620-625 are repeated, either for a user-defined number of iterations or until convergence of the local approximated quadratic model of the loss function FIG. 7 provides an example of a parallel processing memory architecture 700 that may be utilized by to perform computations related to execution of the eigCG-HF algorithm, according to some embodiments of the present invention. This architecture 700 may be used in embodiments of the present invention where NVIDIA™ CUDA (or a similar parallel computing platform) is used. The architecture includes a host computing unit ("host") 705 and a GPU device ("device") 710 connected via a bus 715 (e.g., a PCIe bus). The host 705 includes the central processing unit, or "CPU" (not shown in FIG. 7) and host memory 725 accessible to the CPU. The device 710 includes the graphics processing unit (GPU) and its associated memory 720, referred to herein as device memory. The device memory 720 may include various types of memory, each optimized for different memory usages. For example, in some embodiments, the device memory includes global memory, constant memory, and texture memory.

Parallel portions of a deep learning application may be executed on the architecture 700 as "device kernels" or simply "kernels." A kernel comprises parameterized code configured to perform a particular function. The parallel computing platform is configured to execute these kernels in an optimal manner across the architecture 700 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 700 of FIG. 7 (or similar architectures) may be used to parallelize training of a deep neural network. For example, in some embodiments, the training dataset is partitioned such that multiple kernels execute the eigCG-HF algorithm 200 simultaneously on subsets of the training data. In other embodiments, the eigCG solver itself may be implemented such that various operations performed with solving the system are done in parallel.

The device 710 includes one or more thread blocks 730 which represent the computation unit of the device 710. The term thread block refers to a group of threads that can cooperate via shared memory and synchronize their execution to coordinate memory accesses. For example, in FIG. 7, threads 740, 745 and 750 operate in thread block 730 and access shared memory 735. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 7, the thread blocks 730 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of subsets of the training data or operations performed by the eigCG solver may be partitioned over thread blocks automatically by the parallel computing platform software. However, in other embodiments, the individual thread blocks can be selected and configured to optimize training of the deep learning network. For example, in one embodiment, each thread block is assigned a subset of training data with overlapping values.

Continuing with reference to FIG. 7, registers 755, 760, and 765 represent the fast memory available to thread block 730. Each register is only accessible by a single thread. Thus, for example, register 755 may only be accessed by thread 740. Conversely, shared memory is allocated per thread block, so all threads in the block have access to the same shared memory. Thus, shared memory 735 is designed to be accessed, in parallel, by each thread 740, 745, and 750 in thread block 730. Threads can access data in shared memory 735 loaded from device memory 720 by other threads within the same thread block (e.g., thread block 730). The device memory 720 is accessed by all blocks of the grid and may be implemented using, for example, Dynamic Random-Access Memory (DRAM).

Each thread can have one or more levels of memory access. For example, in the architecture 700 of FIG. 7, each thread may have three levels of memory access. First, each thread 740, 745, 750, can read and write to its corresponding registers 755, 760, and 765. Registers provide the fastest memory access to threads because there are no synchronization issues and the register is generally located close to a multiprocessor executing the thread. Second, each thread 740, 745, 750 in thread block 730, may read and write data to the shared memory 735 corresponding to that block 730. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 710 to read and/or write to the device memory. Device memory requires the longest time to access because access must be synchronized across the thread blocks operating on the device. Thus, in some embodiments, the processing of each seed point is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 7, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for training a deep learning network, the method comprising:
    defining a loss function corresponding to the deep learning network;
    receiving a training dataset comprising a plurality of training samples;
    setting current parameter values of the deep learning network to initial parameter values;
    using a computing platform to perform an optimization method which iteratively minimizes the loss function over a plurality of iterations, wherein each iteration comprises:
        applying an eigCG solver to (a) determine a descent direction by minimizing a local approximated quadratic model of the loss function with respect to current parameter values and the training dataset and (b) approximate a leftmost eigenvector and a responding eigenvalue of a matrix of second-order partial derivatives of the loss function,
        using the leftmost eigenvector as a negative curvature direction to prevent the optimization method from converging to saddle points,
        selecting a final descent direction as either the descent direction or the negative curvature direction based on a test on a rate of decrease of the local approximated quadratic model of the loss function in the negative curvature direction,
        using a curvilinear line-search or adaptive line-search to guide the optimization method to a local minimum, and
        updating the current parameter values based on the final descent direction.

2. The method of claim 1, wherein the local approximated quadratic model of the loss function comprises the loss function applied to the current parameter values, the gradient of the loss function when applied to the current parameter values, and an approximation of the curvature of the loss function.

3. The method of claim 2, wherein the local approximate quadratic model incorporates stochastic Hessian information corresponding to the training dataset.

4. The method of claim 3, wherein the stochastic Hessian information comprises a random sampling the training dataset.

5. The method of claim 4, wherein the random sampling the training dataset is resampled during each of the plurality of iterations.

6. The method of claim 1, wherein the initial parameter values are selected based on a random sampling of the training dataset.

7. The method of claim 1, wherein the current parameter values are further updated according to a learning rate determined by a line search method.

8. The method of claim 7, wherein the line search method is an Armijo line search method or Goldstein line-search method.

9. A system for training a deep learning network, the system comprising:
one or more processors;
a non-transitory, computer-readable storage medium in operable communication with the processors, wherein the computer-readable storage medium comprises one or more programming instructions that, when executed, cause the processors to:
define a loss function corresponding to the deep learning network;
receive a training dataset comprising a plurality of training samples;
set current parameter values of the deep learning network to initial parameter values;
using a computing platform to iteratively minimizing the loss function over a plurality of iterations, wherein each iteration comprises:
applying an eigCG solver to (a) determine a descent direction by minimizing a local approximated quadratic model of the loss function with respect to current parameter values and the training dataset and (b) approximate a leftmost eigenvector and a responding eigenvalue of a matrix of second-order partial derivatives of the loss function,
using the leftmost eigenvector as a negative curvature direction to prevent the optimization method from converging to saddle points,
selecting a final descent direction as either the descent direction or the negative curvature direction based on a test on a rate of decrease of the local approximated quadratic model of the loss function in the negative curvature direction,
using a curvilinear line-search or adaptive line-search to guide the optimization method to a local minimum, and
updating the current parameter values based on the final descent direction.

10. The system of claim 9, wherein the local approximated quadratic model of the loss function comprises the loss function applied to the current parameter values, the gradient of the loss function when applied to the current parameter values, and an approximation of the curvature of the loss function.

11. The system of claim 10, wherein the local approximate quadratic model incorporates stochastic Hessian information corresponding to the training dataset.

12. The system of claim 11, wherein the stochastic Hessian information comprises a random sampling the training dataset.

13. The system of claim 12, wherein the random sampling the training dataset is resampled during each of the plurality of iterations.

14. The system of claim 9, wherein the initial parameter values are selected based on a random sampling of the training dataset.

15. The system of claim 9, wherein the one or more processors are part of a parallel computing platform which is used to parallelize one or more processing operations included in iteratively minimizing the loss function.

16. The system of claim 15, wherein the training dataset is divided into a plurality of training subsets and the eigCG solver is applied to each of the training subsets in parallel to determine the descent direction by minimizing the local approximated quadratic model of the loss function with respect to the current parameter values and the training subset.

17. An article of manufacture for training a neural network, the article of manufacture comprising a non-transitory, tangible computer-readable medium holding computer-executable instructions for performing a method comprising:
receive a training dataset comprising a plurality of training samples;
setting current parameter values of the deep learning network to initial parameter values;
iteratively minimizing a loss function corresponding to the neural network over a plurality of iterations, wherein each iteration comprises:
applying an eigCG solver to (a) determine a descent direction by minimizing a local approximated quadratic model of the loss function with respect to current parameter values and the training dataset and (b) approximate a leftmost eigenvector and a responding eigenvalue of a matrix of second-order partial derivatives of the loss function,
using the leftmost eigenvector as a negative curvature direction to prevent the optimization method from converging to saddle points,
selecting a final descent direction as either the descent direction or the negative curvature direction based on a test on a rate of decrease of the local approximated quadratic model of the loss function in the negative curvature direction,
using a curvilinear line-search or adaptive line-search to guide the optimization method to a local minimum, and
updating the current parameter values based on the final descent direction.

* * * * *